United States Patent [19]

Kitabatake

[11] Patent Number: 6,006,352
[45] Date of Patent: Dec. 21, 1999

[54] BITSTREAM DECODING APPARATUS WITH REDUCED ERROR CORRECTION PROCESSING AND DECODING METHOD

[75] Inventor: Osamu Kitabatake, Kanagawa, Japan

[73] Assignee: NEC Corporation, Tokyo, Japan

[21] Appl. No.: 08/883,599

[22] Filed: Jun. 26, 1997

[30] Foreign Application Priority Data

Jun. 27, 1996 [JP] Japan ................................. 8-167767

[51] Int. Cl.⁶ .................................................. H03M 13/00
[52] U.S. Cl. ............................... 714/752; 714/786; 714/3
[58] Field of Search ..................... 714/752, 700, 714/775, 798, 789; 360/26, 751

[56] References Cited

U.S. PATENT DOCUMENTS

| | | | |
|---|---|---|---|
| 4,796,243 | 1/1989 | Kato | 360/36.2 |
| 5,596,603 | 1/1997 | Haupt et al. | 375/242 |
| 5,764,658 | 6/1998 | Sekiguchi et al. | 371/37.1 |

FOREIGN PATENT DOCUMENTS

| | | |
|---|---|---|
| 60-246065 | 12/1985 | Japan . |
| 61-225940 | 10/1986 | Japan . |
| 62-206928 | 9/1987 | Japan . |
| 6-77909 | 3/1994 | Japan . |

OTHER PUBLICATIONS

Patent Abstracts of Japan, vol. 010, No. 116 (P–452), Apr. 30, 1986 & JP 60 246065 A (Hitashi), Dec. 5, 1985.

A Study on Variable Length Frame Synchronization for Mobile Multimedia Communications, Nobuhiko Naka, Takashi Suzuki, Toshiro Kawahara, Toshio Miki.

Primary Examiner—Albert De Cady
Assistant Examiner—Esaw Abraham
Attorney, Agent, or Firm—Sughrue, Mion, Zinn, Macpeak & Seas, PLLC

[57] ABSTRACT

A decoding apparatus and a decoding method are capable of minimizing degradation of the quality of images and sounds when a synchronous signal error occurs. The decoding apparatus includes a frame counter for receiving a bit stream, a synchronous pattern detector, a data error check unit, a synchronous detector, and a frame error determination unit. A synchronous detection error occurrence signal produced by the synchronous detector is not output to an external error processing circuit but is directly transmitted to the frame error determination unit. Even when the timing of an output synchronous pattern detection signal from the synchronous pattern detector and the timing of an output frame position signal from the frame counter do not match each other and a frame synchronous abnormality occurs, if the data itself is normal then decoding processing is executed without performing any error correction processing.

3 Claims, 2 Drawing Sheets

BITSTREAM DECODING APPARATUS WITH REDUCED ERROR CORRECTION PROCESSING AND DECODING METHOD

BACKGROUND OF THE INVENTION

1. Field of the Invention

The present invention relates to a decoding apparatus and a decoding method and, more particularly, to a decoding apparatus which functions as a bit stream decoding means in transmission and storage systems for compressed and non-compressed signals of sounds and images.

2. Description of the Prior Art

One example of a conventional decoding apparatus of this sort is shown in a block diagram of FIG. 1. As shown in FIG. 1, this conventional apparatus comprises a frame counter 31 for receiving a bit stream 101, a synchronous pattern detector 32, a data error check unit 33, a synchronous detector 34, and a frame error determination unit 35. FIG. 2 shows the structure of a unit frame of a bit stream to be decoded by this decoding apparatus. This unit frame consists of a synchronous pattern 201, data 202 and 204, and an error check pattern 203. The synchronous pattern 201 functions as a synchronous position detection pattern for maintaining frame synchronization. The data 202 and 204 are formed by compressing image data or sound data. The error check pattern 203 is used to check whether image data or sound data present in that unit frame has an error. Referring to FIG. 2, the data 204 of an immediately preceding unit frame connects to the synchronous pattern 201 of the next unit frame. In bit stream transmission, data encapsulated in these unit frames is continuously transmitted.

Referring to FIG. 1, the bit stream 101 with the frame structure shown in FIG. 2 is input at an input terminal 36 to the frame counter 31, the synchronous pattern detector 32, and the data error check unit 33. The synchronous pattern detector 32 detects the synchronous pattern 201 arranged at the head of the unit frame and outputs a synchronous pattern detection signal 104 to the frame counter 31 and the synchronous detector 34. Upon receiving this synchronous pattern detection signal 104, the frame counter 31 starts counting and performs the count operation for each unit frame of the input bit stream from the input terminal 36. Also, the frame counter 31 outputs a frame position signal 102 to the synchronous detector 34. If the timing of the frame position signal 102 transmitted to the synchronous detector 34 matches the timing of the synchronous pattern 201, which is contained in the synchronous pattern detection signal 104 and arranged at the head of the next unit frame, this indicates a normal synchronous state in which the synchronous pattern 201 in the unit frame is present in a normal synchronous position.

The synchronous detector 34 receives the frame position signal 102 supplied from the frame counter 31 and the synchronous pattern 201 in the next frame contained in the synchronous pattern detection signal 104 supplied from the synchronous pattern detector 32. If the timings of the frame position signal 102 and the synchronous pattern 201 in the next unit frame match each other, the synchronous detector 34 outputs a predetermined synchronous detection signal 103 to the frame counter 31 and the data error check unit 33. The frame counter 31 is initialized by this synchronous detection signal 103. Thereafter, as long as normal frames are continuously input, a series of synchronous detection operations as described above are repeatedly executed. If the timings of the frame position signal 102 and the synchronous pattern 201 in the next unit frame do not match each other, the synchronous detector 34 determines that some abnormality has occurred in the detection of the synchronous pattern, and outputs a synchronous detection error occurrence signal 106 to an external error processing circuit (not shown). The data error check unit 33 performs error check detection by referring to the error check pattern 203 in the unit frame of the bit stream. If an error is detected, the data error check unit 33 outputs a data error occurrence signal 105 to the frame error determination unit 35. When receiving this data error occurrence signal 105, the frame error determination unit 35 determines that an abnormality has occurred in the data in the frame, and outputs a frame error occurrence signal 107 to the error processing circuit (not shown).

In a normal decoding process, irrespective of whether the synchronous detection error occurrence signal 106 or the frame error occurrence signal 107 is output, it is determined that an abnormality has occurred in the data in the corresponding frame, and error processing is performed.

As a method of avoiding synchronous error detection for a bit stream input, a conventional technique proposed in Japanese Unexamined Patent Publication No. 60-246065 will be described next. In the method described in this proposal, if the synchronous signal has an error, another error detecting means locates and corrects the error. The gist of the contents of this conventional correction operation is as follows.

That is, an input synchronous signal from an input terminal is applied to a shift register by clocks. The shift register outputs the signal to a predetermined synchronous pattern coincidence circuit. If the synchronous signal has no error and exists in a correct position, an output terminal outputs a signal indicating that the synchronous signal is detected. Upon receiving the signal, a CRC arithmetic circuit is reset. Also, if data has no error, a CRC check terminal outputs a desired signal. An error flag signal is previously attached to the synchronous signal and applied from the input terminal to the shift register. If an error exists, correction processing is performed using the output from a circuit which is counting a signal in which the corresponding synchronous signal is detected. Therefore, if the synchronous signal pattern is entirely correct, synchronous detection can be performed only by using this pattern. If an error pattern with an error flag is present in a synchronous signal, detection is performed by taking account of the position from a CRC code. This prevents erroneous detection of a synchronous signal.

In the conventional decoding apparatus shown in FIG. 1, a synchronous signal is usually added to the head of a unit frame of a transmission bit stream, and a general approach is to allow the synchronous detector of the decoding apparatus to establish synchronization of that frame. However, if an error is generated in the synchronous signal due to, e.g., transmission, a synchronous error is produced by this error. Consequently, no frame decoding is performed, and error correction processing such as interpolation or muting is performed instead. This unavoidably degrades the quality of images and sounds.

Also, the following is a drawback of the method proposed in Japanese Unexamined Patent Publication No. 60-246065 in which in order to prevent synchronous error detection, an error flag is added to a synchronous signal, and the synchronous signal is corrected on the basis of an error position found by the error flag to thereby avoid synchronous error detection. That is, in the processing of particularly signal compression systems such as MPEG, the compression rate is improved by, e.g., decreasing the rate of a transmission system or reducing the storage capacity of a storage system. Consequently, it is practically very difficult to add redundant error detection data, which can locate an error position, to a transmission bit stream. Accordingly, one can only use a means of adding data capable of detecting only occurrence of an error. Under these circumstances, it is impossible to satisfactorily correct the synchronous signal position even with the application of the technique proposed in Japanese Unexamined Patent Publication No. 60-246065.

SUMMARY OF THE INVENTION

It is an object of the present invention to realize a decoding apparatus and a decoding method capable of performing decoding processing without performing any error correction processing such as frame interpolation or muting, as long as no errors exist in data of images and sounds even if a synchronous error occurs in detection of a synchronous signal, and thereby capable of minimizing degradation of the quality of images and sounds.

A decoding apparatus according to the present invention at least comprises synchronous pattern detecting means for receiving a bit stream, detecting a synchronous pattern of the bit stream, and producing and outputting a predetermined synchronous pattern detection signal; frame counter means which is reset by a predetermined synchronous detection signal, starts counting the bit stream in accordance with the synchronous pattern detection signal, and produces and outputs a frame position signal; synchronous detecting means for receiving the synchronous pattern detection signal and the frame position signal, producing and outputting the synchronous detection signal if timings of the synchronous pattern detection signal and the frame position signal match each other, and producing and outputting a synchronous error occurrence signal if the two timings do not match each other; a data error check unit for receiving the bit stream, performing error check for data of the bit stream, and producing and outputting a data error occurrence signal if an error is present in the data; and frame error determining means for receiving the synchronous error occurrence signal and the data error occurrence signal and outputting a frame error occurrence signal to an external apparatus, wherein when a data error check yields a normal result even if an abnormality occurs in frame synchronization and a synchronous error, is generated decoding processing is executed without performing any error correction processing.

Also, a decoding method according to the present invention comprises, as a decoding procedure for the bit stream, the first step of detecting a synchronous pattern in a unit frame of a bit stream and producing a synchronous pattern detection signal corresponding to the synchronous pattern; the second step of starting counting the bit stream in accordance with the synchronous pattern detection signal and producing a frame position signal for identifying a position of the unit frame of the bit stream; the third step of detecting a synchronous pattern of a unit frame next to the first unit frame and producing a synchronous pattern detection signal corresponding to the synchronous pattern; the fourth step of checking whether a timing of the frame position signal and a timing of the synchronous pattern detection signal produced in the third step match each other, upon determining that the two timings match each other, returning the flow to the first step and repeatedly executing the procedure from the first step for each unit frame of the sequentially input bit stream, and upon determining that the two timings do not match each other, advancing the flow to the fifth step; the fifth step of checking, if it is determined in the fourth step that the two timings do not match each other, whether the corresponding unit frame contains a data error, and the sixth step of performing decoding processing by processing the corresponding unit frame as a normal frame, if no data error exists in the fifth step.

DETAILED DESCRIPTION OF THE PREFERRED EMBODIMENT

The present invention will be described below with reference to the accompanying drawings.

Figure 1:
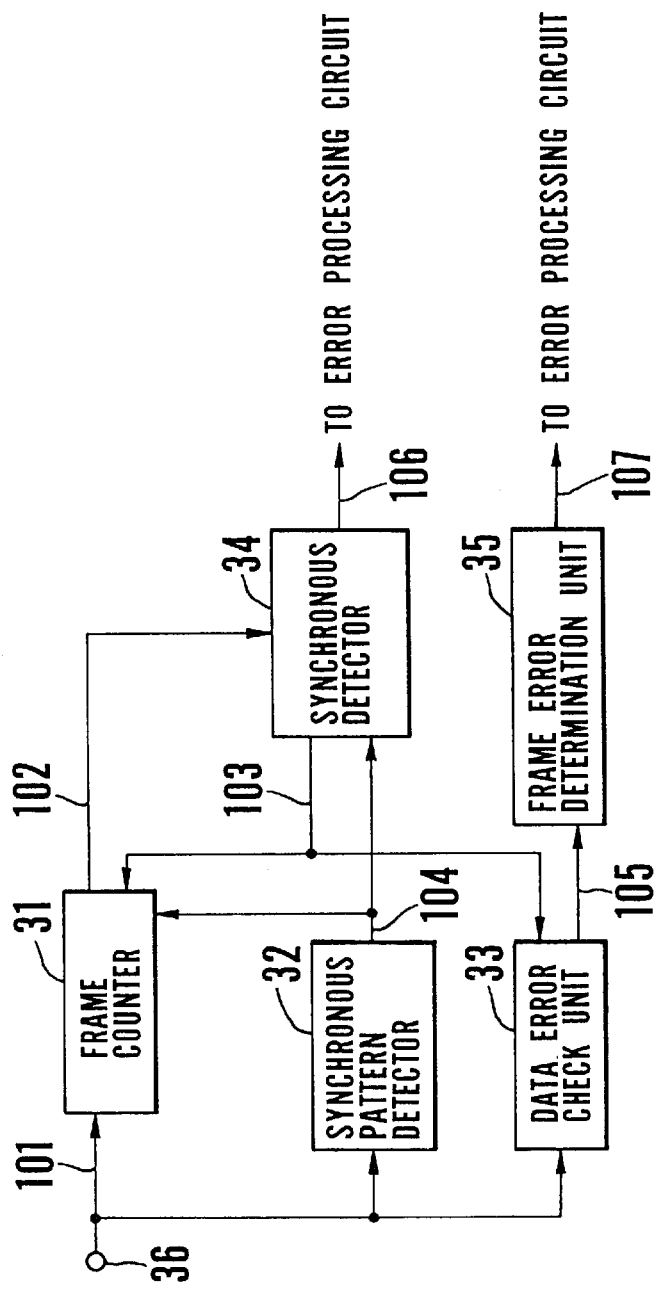
FIG. 1 is a block diagram showing the arrangement of a conventional decoding apparatus.
Figure 2:
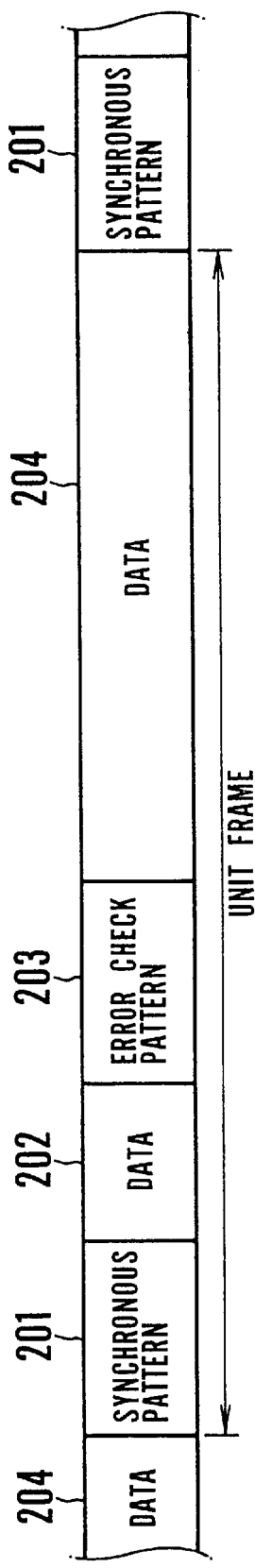
FIG. 2 is a view showing the structure of a unit frame of a bit stream to be decoded by the decoding apparatus.
Figure 3:
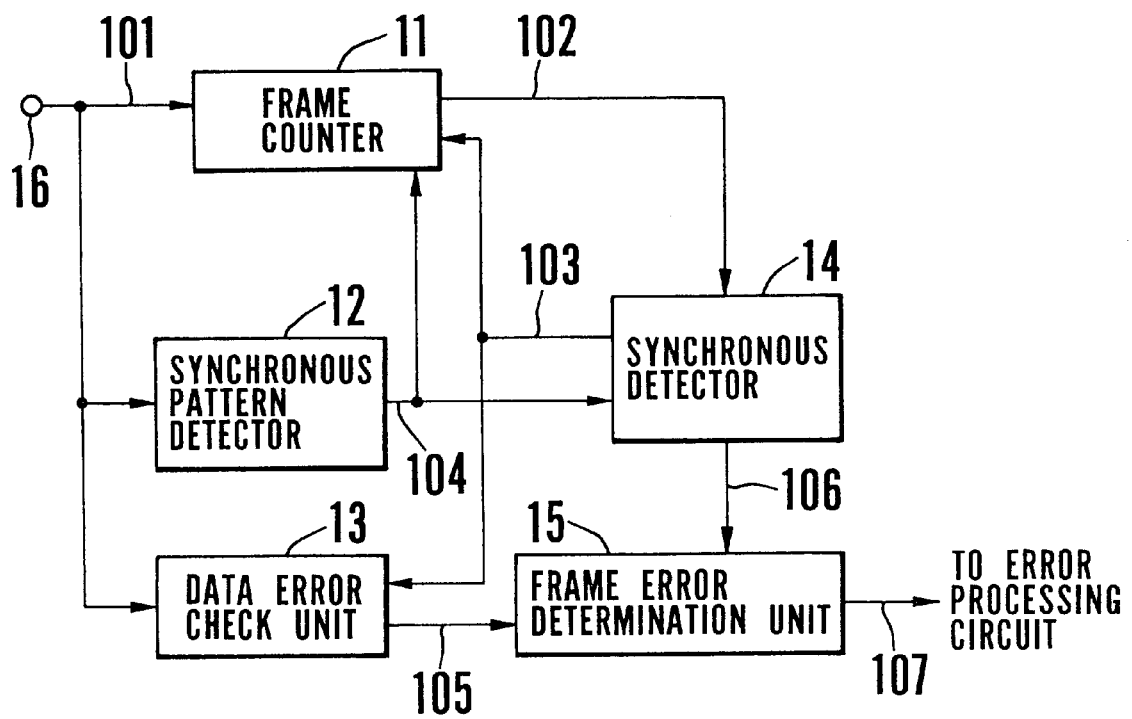
FIG. 3 is a block diagram showing one embodiment of a decoding apparatus according to the present invention.

FIG. 3 is a block diagram showing one embodiment of the present invention. As shown in FIG. 3, this embodiment comprises a frame counter 11 for receiving a bit stream 101, a synchronous pattern detector 12, a data error check unit 13, a synchronous detector 14, and a frame error determination unit 15. This embodiment differs from the conventional apparatus shown in FIG. 1 in that the synchronous detection error occurrence signal 106 produced by the synchronous detector 14 is not output to an external error processing circuit but is directly transmitted to the frame error determination unit 15. Note that the structure of a unit frame of a bit stream to be decoded by this decoding apparatus is the same as the one shown in FIG. 2 cited in "DESCRIPTION OF THE PRIOR ART". This unit frame consists of a synchronous pattern 201, data 202 and 204, and an error check pattern 203. The synchronous pattern 201 functions as a synchronous position detection pattern for maintaining frame synchronization. The data 202 and 204 are formed by compressing image data or sound data. The error check pattern 203 is used to check whether image data or sound data present in that unit frame has an error.

Referring to FIG. 3, the bit stream 101 with the frame structure shown in FIG. 2 is input at an input terminal 16 to the frame counter 11, the synchronous pattern detector 12, and the data error check unit 13. The synchronous pattern detector 12 detects the synchronous pattern 201 arranged at the head of a unit frame and outputs a synchronous pattern detection signal 104 to the frame counter 11 and the synchronous detector 14. Upon receiving this synchronous pattern detection signal, the frame counter 11 starts counting and performs the count operation for each unit frame in the input bit stream 101 from the input terminal 16. Also, the frame counter 11 outputs a frame position signal 102 to the synchronous detector 14. As already described previously, if the timing of the frame position signal 102 transmitted to the synchronous detector 14 matches the timing of the synchronous pattern 201, which is contained in the synchronous pattern detection signal 104 and arranged at the head, i.e., in a normal position, of the next unit frame, this indicates a normal synchronous state in which the synchronous pattern 201 in the unit frame exists in a normal synchronous position.

The synchronous detector 14 receives the frame position signal 102 supplied from the frame counter 11 and the synchronous pattern 201 in the next unit frame contained in the synchronous pattern detection signal 104 supplied from the synchronous pattern detector 12. If the timings of the frame position signal 102 and the synchronous pattern 201 in the next unit frame match each other, the synchronous detector 14 outputs a predetermined synchronous detection signal 103 to the frame counter 11 and the data error check unit 13. The frame counter 11 is initialized by this synchronous detection signal 103 and again starts the count operation. Thereafter, while normal frames are continuously applied from the input terminal 16, a series of synchronous detection operations as above are repeatedly executed. If a synchronous pattern abnormality occurs in the synchronous pattern 201 in the next unit frame due to, e.g., failures of the transmission path or the storage system, the timings of the frame position signal 102 and the synchronous pattern 201 in the next unit frame cease to match each other. Consequently, the synchronous detector 14 determines that some abnormality has occurred in the detection of the synchronous pattern, and outputs a synchronous detection error occurrence signal 106 to the frame error determination unit 15. Meanwhile, the data error check unit 13 performs error check detection for the data 202 and 204 by referring to the error check pattern 202 in the unit frame of the bit stream 101. If an error is detected, the data error check unit 13 outputs a data error occurrence signal 105 to the frame error determination unit 15. When receiving both the data error occurrence signal 105 and the synchronous detection error occurrence signal 106 from the synchronous detector 14, the frame error determination unit 15 outputs a frame error occurrence signal 107 to an external error processing circuit (not shown). However, if the data error occurrence signal 105 is not applied even though the synchronous detection error occurrence signal 106 is applied, the frame error determination unit 15 does not output the frame error occurrence signal 107 to the external error processing circuit (not shown), and the frame is processed as a normal frame for the reason to be explained below. That is, the synchronous pattern 201 is not related to the contents of the data 202 and 204, so decoding processing can be correctly performed even if an abnormality occurs in the synchronous pattern 201.

A decoding procedure in this embodiment is as follows. In the first step, the synchronous pattern detector 12 detects the synchronous pattern 201 in the unit frame of the input bit stream 101 from the input terminal 16 and produces a corresponding synchronous pattern detection signal 104. In the second step, in accordance with this synchronous pattern detection signal 104, the frame counter 11 starts counting the bit stream 101 and produces a frame position signal 102. In the third step, the synchronous pattern detector 12 detects the synchronous pattern 201 in the unit frame next to the first unit frame and produces a synchronous pattern detection signal 104 corresponding to the synchronous pattern 201. In the fourth step, the synchronous detector 14 checks whether the timing of the frame position signal 102 matches the timing of the synchronous pattern detection signal 104 produced in the third step. If the synchronous detector 14 determines that the two timings match each other, the frame counter 11 is initialized by a synchronous detection signal 103 output from the synchronous detector 14, and the procedure is repeated from the first step. If the synchronous detector 14 determines that the two timings do not match each other, the flow of the procedure advances to the fifth step, and the data error check unit 13 checks whether the corresponding unit frame contains a data error. If no data error exists in the fifth step, the flow advances to the sixth step, and the corresponding unit frame is processed as a normal frame, i.e., the unit frame is decoded without performing any error processing. That is, when no data error exists even if an abnormality is found in frame synchronization, decoding is performed without performing any error processing such as interpolation and muting. This minimizes degradation of the quality of images and sounds.

In the present invention as has been described above, even when an abnormal state occurs in synchronous pattern detection by the synchronous pattern detecting means and an error exists only in a synchronous signal, a synchronous error occurrence signal produced in accordance with this frame synchronous abnormality is not output to an external frame processing circuit. When data bits are normal in data error check, no error processing such as interpolation or muting is performed. The result is an effect of minimizing degradation of the quality of a compressed signal of images and sounds when a bit stream is input.

What is claimed is:

1. A decoding apparatus, comprising:

synchronous pattern detecting means for receiving a bit stream, detecting a synchronous pattern of the bit stream, and producing and outputting a synchronous pattern detection signal;

frame counter means which is reset by a predetermined synchronous detection signal, starts counting the bit stream in accordance with the synchronous pattern detection signal, and produces and outputs a frame position signal;

synchronous detecting means for receiving the synchronous pattern detection signal and the frame position signal, producing and outputting the predetermined synchronous detection signal if timings of the synchronous pattern detection signal and the frame position signal match each other, and producing and outputting a synchronous error occurrence signal if the timings do not match each other;

a data error check unit for receiving the bit stream, performing error check for data of the bit stream, and producing and outputting a data error occurrence signal if an error is present in the data; and frame error determining means for receiving the synchronous error occurrence signal and the data error occurrence signal and outputting a frame error occurrence signal to an external apparatus, wherein when the error check yields a normal result even if an abnormality occurs in frame synchronization and generates a synchronous error, decoding processing is executed without performing any error correction processing.

2. A decoding method for decoding a sequentially input bit stream, comprising the steps of:

a first step of detecting a synchronous pattern in a unit frame of a bit stream and producing a first synchronous pattern detection signal corresponding to the synchronous pattern;

a second step of starting counting the bit stream in accordance with the first synchronous pattern detection signal and producing a frame position signal for identifying a position of the unit frame of the bit stream;

a third step of detecting the synchronous pattern in a next subsequent unit frame and producing a second synchronous pattern detection signal corresponding to the synchronous pattern;

a fourth step of determining whether a first timing of the frame position signal and a second timing of the second synchronous pattern detection signal match each other, wherein upon determining that the first and second timings match each other, returning to the first step and repeatedly executing the first through fourth steps for each unit frame of the sequentially input bit stream, and wherein upon determining that the first and second timings do not match each other, advancing to a fifth step;

the fifth step of checking, if it is determined in the fourth step that the first and second timings do not match each other, whether a corresponding unit frame contains a data error; and a sixth step of performing decoding processing by processing the corresponding unit frame as a normal frame if no data error exists in the fifth step.

3. A decoding method for decoding a sequentially input bit stream as claimed in claim 2, wherein the sixth step further comprises outputting a frame error occurrence signal only if a data error is found in the fifth step and if the first and second timings do not match each other.

* * * * *